United States Patent Office 3,437,241
Patented Apr. 8, 1969

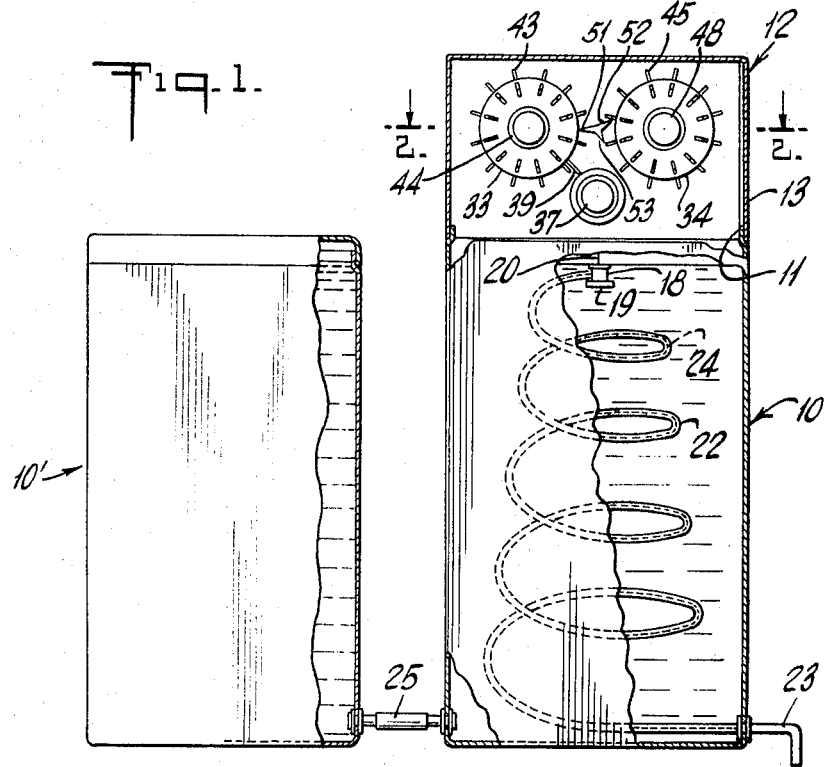
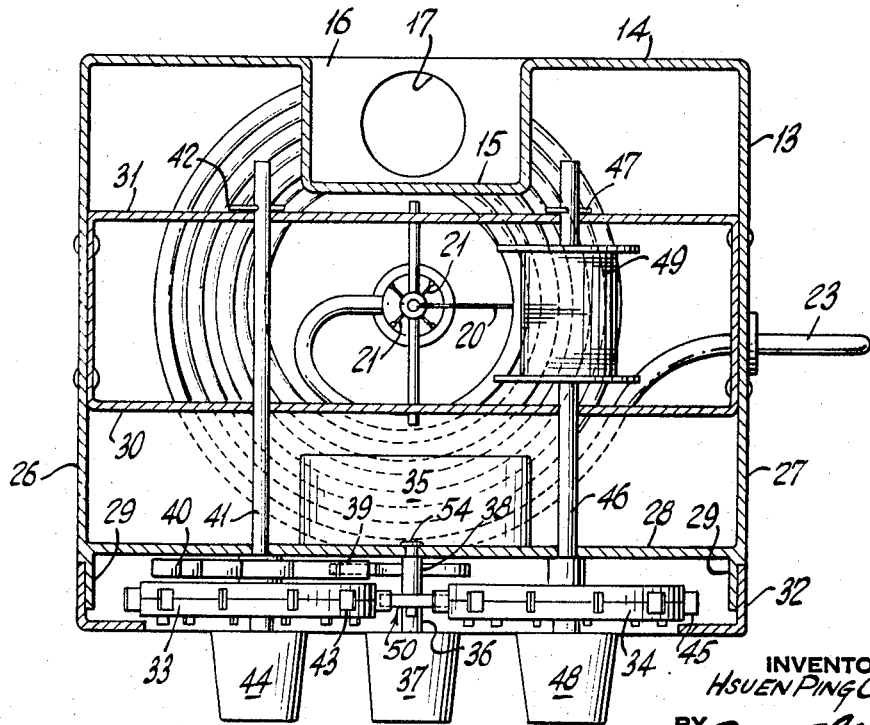

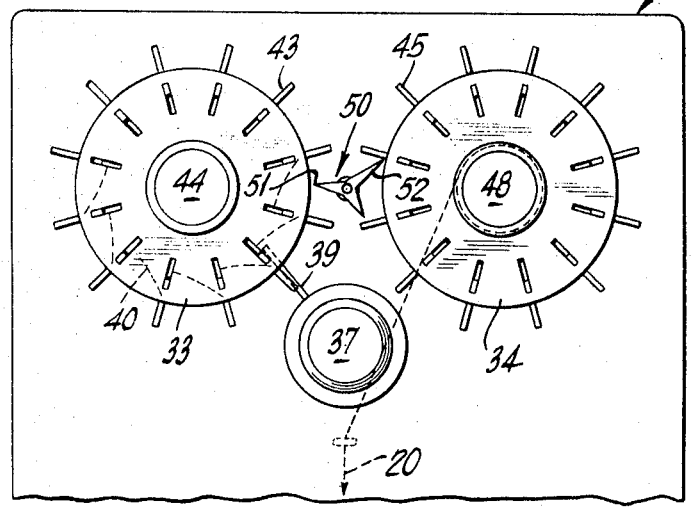
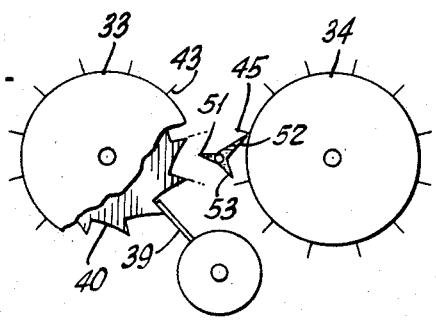
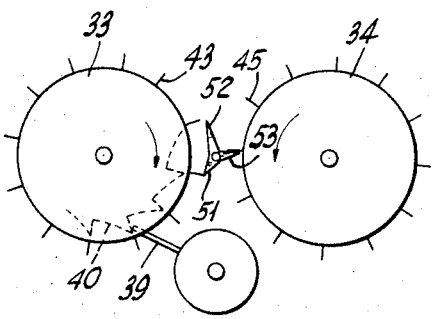
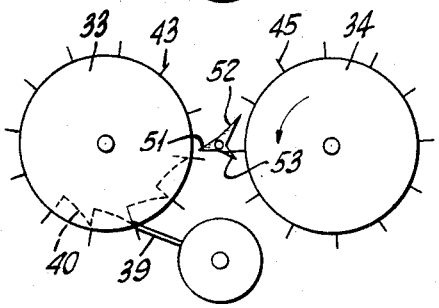
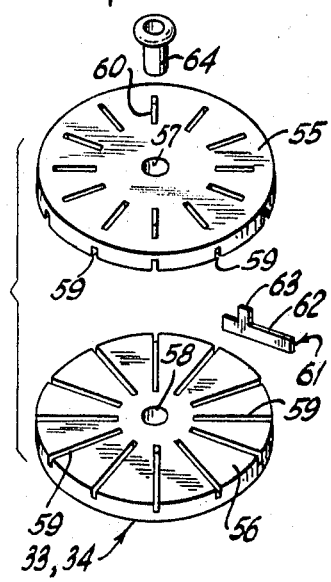
INVENTOR
HSUEN PING C. PEI

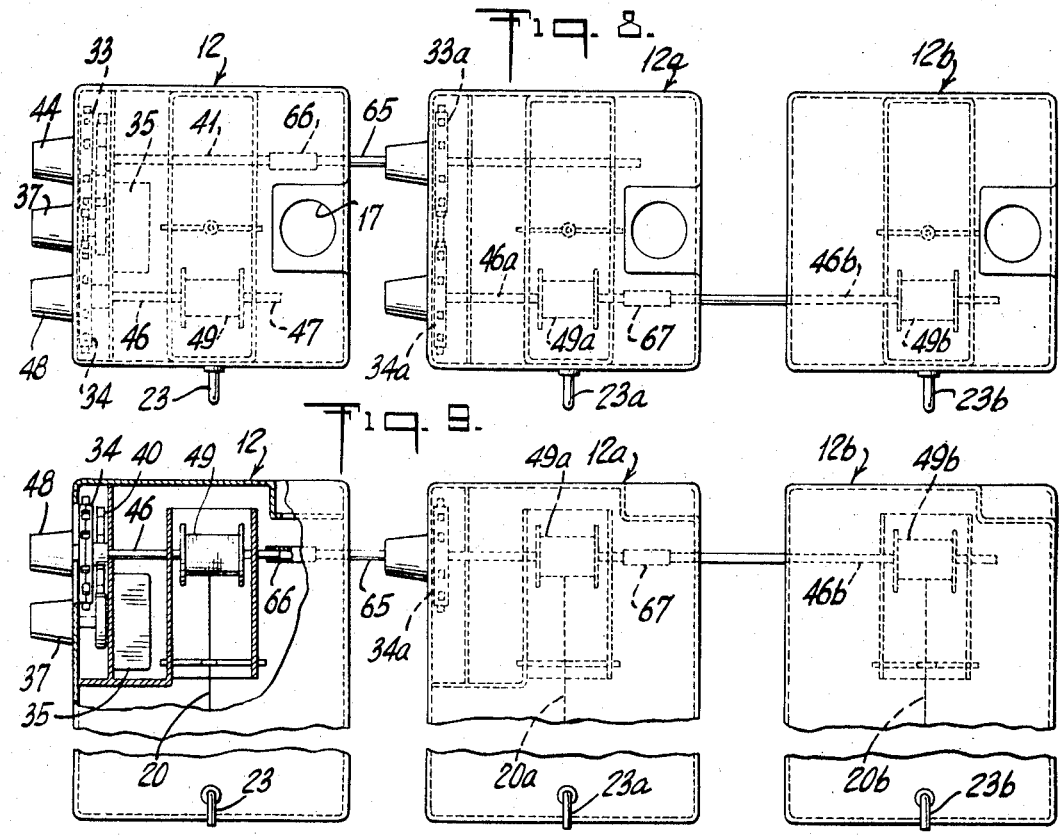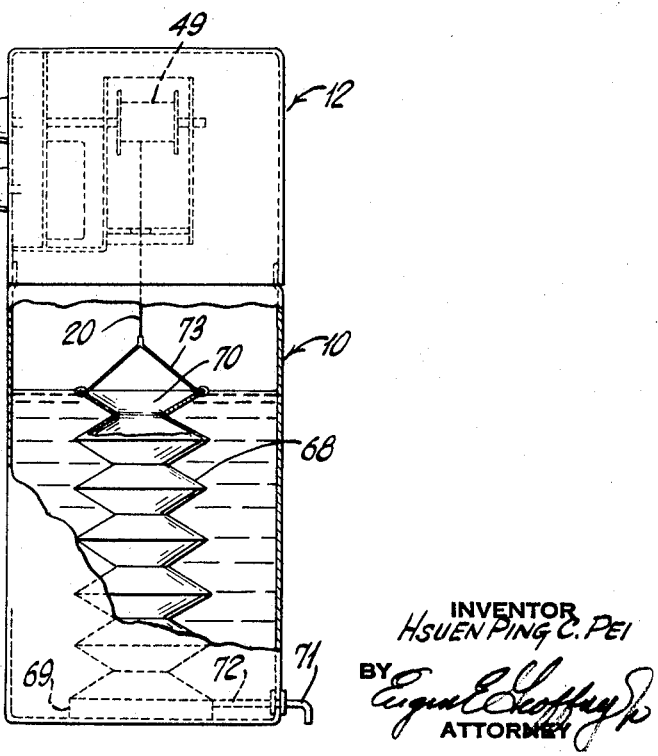

3,437,241
LIQUID METERING AND DISPENSING
APPARATUS
Hsuen-Ping C. Pei, 505 E. 79th St.,
New York, N.Y. 10021
Filed Dec. 9, 1966, Ser. No. 600,531
Int. Cl. B67d 5/30
U.S. Cl. 222—70                                    6 Claims

ABSTRACT OF THE DISCLOSURE

Liquid metering and dispensing apparatus for automatically delivering specific quantities of liquid at specific intervals determined by the timing means.

---

This invention relates to liquid metering apparatus and more specifically to a novel and improved apparatus for delivering metered quantities of liquid such as water or the like at selected intervals and which is useful among other things for watering plants and flowers.

Liquid metering devices have been suggested in the past, but known devices have utilized relatively complicated valving and timing means involving substantial expense for both manufacture and maintenance. Furthermore, even the more expensive automatically operated valves, particularly when used with water, are subject to corrosion and deterioration and generally require frequent attention to insure proper operation. This invention overcomes the difficulties and shortcomings of prior known devices and provides an improved device which is not only inexpensive, durable and reliable, but one that is readily adjustable to provide selected amounts of liquid at predetermined intervals. For instance, in connection with the embodiment of the invention to be described which is particularly useful for watering plants, water delivery intervals from one through twelve days can be selected and the quantity of water delivered at each interval can be modified over a range of one to twelve units with the unit quantity of water being determined by design of the apparatus.

Another object of the invention resides in the provision of a novel and improved device for delivering metered quantities of water at regular intervals utilizing improved means to insure delivery of precise quantities of water and avoid difficulties normally encountered in known valving devices.

A still further object of the invention resides in the provision of a novel and improved plant watering device which may be readily arranged for instance to deliver different quantities of water to different plants and at the same time at different intervals of time.

The above and other objects of the invention will become more apparent from the following description and accompanying drawings forming part of this application.

In the drawings:

FIGURE 1 is an elevational view in partial section of liquid metering apparatus in accordance with the invention.

FIGURE 2 is a cross-sectional view of FIGURE 1 taken along the line 2—2 thereof.

FIGURE 3 is an enlarged view of the control apparatus illustrated in FIGURE 1.

FIGURES 4, 5, and 6 are diagrammatic views illustrating the operation of the metering apparatus in accordance with the invention.

FIGURE 7 is an exploded perspective view of one embodiment of the adjustable rotary control element utilized for timing and metering operations.

FIGURE 8 is a plan view of apparatus in accordance with the invention wherein a meter unit is utilized to control a pair of slave units for delivering selected quantities of liquids from individual containers.

FIGURE 9 is a side elevational view of the apparatus shown in FIGURE 8.

FIGURE 10 is a side elevational view in partial section of a modified form of valving means in accordance with the invention.

Referring now to the drawings and more specifically to FIGURES 1 through 3, the numeral 10 denotes in the illustrated embodiment of the invention a water container which may be of any desired shape or configuration. The top edge of the container is offset inwardly as indicated at 11 for receiving and holding metering apparatus generally denoted by the numeral 12. This metering apparatus includes a housing 13 having a rear wall 14 recessed at 15. A plate 16 having a filler opening 17 is secured to the underside of the recessed portion 15 of the rear wall to facilitate filling of the receptacle 10 with water.

Metering of the water is accomplished by novel and improved valving means which includes an inlet device consisting of a cylindrical inlet 18 closed at the bottom and to which a piece of relatively heavy metal 19 such as stainless steel, lead or the like is secured. This inlet device is supported by a cord 20 which, as will be described, functions to lower the inlet device 18 to permit water to flow therein. The cord 20 may be attached to the inlet device by any suitable means such as the diametral supports as shown more clearly in FIGURE 2. It is apparent, however, that any suitable type of support may be utilized provided that the inlet device maintains its vertical position as illustrated in FIGURE 1.

The water outlet comprises a spirally formed tube 22 of relatively thin material which emerges from the bottom of the container to form an outlet 23 to which suitable flexible hose can be connected if desired. In the normal case, the metering device in accordance with the invention can be placed on a support so that the water outlet 23 extends over the plant container. In certain cases it may be desirable to enclose within the tube 22 a fine wire 24 of resilient material which will tend to aid in retraction of the coils of the tube 22 as the inlet device 18 is lowered by the cord 20. The coils of tube 22 are preferably arranged so that, as the inlet device 18 is lowered, the coils lie one within the other. With this arrangement the water is metered by lowering the inlet 18 a predetermined distance and thereby overcomes the difficulties entailed with conventional valves. In the case of large plants requiring increased quantities of water or when it is desired to automatically water plants for extended periods of time an auxiliary container 10' may be utilized in conjunction with the container 10. For this purpose the containers 10 and 10' would be coupled by suitable coupling means 25 at the bases of the containers. Assuming the containers 10 and 10' have the same cross-sectional area, then with the two containers coupled as illustrated, as the inlet is lowered a predetermined distance twice the quantity of water will emerge from the outlet 23.

The timing and metering apparatus is contained within the housing 13. In the instant embodiment of the invention the housing 13 includes in addition to the rear wall 14, side walls 26 and 27, a front wall 28 having a forwardly extending peripheral flange 29 and a pair of transverse parallel frame elements 30 and 31. The peripheral flange 29 carries a frame or escutcheon 32 as illustrated in FIGURE 2 to partially enclose the timing and metering devices 33 and 34.

The basic timing mechanism comprises a motor 35 secured to the back side of the wall 28 of the housing 13 and has a shaft 36 extending through the wall 28 and carrying a knob 37. In the instant embodiment of the invention the motor 35 includes suitable gearing mechanism so that the shaft 36 will rotate once during each twenty-four-hour period. The shaft 36 is fitted with a collar 38 having an actuating arm 39 extending therefrom. This actuating arm engages a ratchet wheel 40 carried by a shaft 41 which extends through the wall 28 and the frame elements 30 and 31. The ratchet wheel 40 is fixedly secured to the shaft 41, and the rear end of the shaft has a pin 42 extending therethrough thus preventing longitudinal displacement. The shaft 41 in addition to carrying the ratchet 40 also carries the timing device 33 which is of annular configuration and has a plurality of radially extending arms or actuators 43. A knob 44 is carried by the outer end of the shaft 41 to facilitate adjustment of the apparatus as will be described.

The metering device 34 is similar to the device 33 and includes a plurality of radially extending arms or actuators 45. The device 34 is fixedly secured to a shaft 46 extending through the front wall 28 of the housing 13 and the frame elements 30 and 31. The rear end of the shaft 46 has a pin 47 to prevent longitudinal displacement. The front end of the shaft is fitted with a knob 48 similar to the knob 44. A drum 49 on which is wound the cord 20 is fixedly carried by the shaft 46 and is disposed between the frame elements 30 and 31.

A pawl 50 having three arms 51, 52, and 53 is pivotally mounted between the timing and metering devices 33 and 34 by means of a shaft 54 secured to the front plate 28. This pawl is actuated by the timing device 33 at selected intervals to release the metering device 34 and permit the latter to rotate through a predetermined angle. Rotation of the metering device 34 is caused by the effect of gravity on the inlet device 18 inasmuch as it is weighted by a metal weight 19. Thus the inlet device 18 will be lowered at an amount determined by the metering device 34 and permit a predetermined quantity of water to emerge from the outlet 23.

The timing and metering devices 33 and 34 are identical and are illustrated more clearly in FIGURE 7. In this figure it will be observed that each device is formed of two annular elements 55 and 56 which may be of identical construction. The elements are provided with central holes 57 and 58, and each element 55 and 56 has a plurality of radially disposed grooves 59 that have a depth corresponding to about half the thickness of the element and open into the periphery of the element. A plurality of radially disposed slots 60 extend through the outer surface of at least element 55 and intersect with the grooves on the reverse side of that element. For simplicity in manufacture, however, it will become apparent that both of the elements 55 and 56 may include the slots 60 even though the slots will serve no useful purpose in the element 56. A plurality of actuators 61 are provided for engagement with the grooves 59 and slots 60. Each actuator has an elongated body 62 and an upwardly extending tab 63. The height of the body 62 corresponds to the total depth of two grooves 59 when the elements 55 and 56 are secured together. The width of the body 62 corresponds to the width of the grooves 59 and the tab 63 has a height sufficient to protrude from the slots 60. In assembly of the device shown in FIGURE 7, actuators 61 are placed in position on the element 55 and then the element 56 is secured to the element 55 by the hollow rivet 64 or other suitable means. With this arrangement it is apparent that the actuators can be moved outwardly to protrude from the periphery of the joined elements 55 and 56 or can be fully retracted as may be desired.

The operation of the apparatus described above is illustrated in FIGURES 3 through 6. Referring more specifically to FIGURE 3, it will be observed that the timing device 33 is actuated by the arm 39 which engages successive teeth in the ratchet 40. Thus the timing device is moved through an angle corresponding to the angular separation of the ratchet teeth once during every twenty-four-hour period. In so doing one of the actuating arms 43 of the timing device 33 engages the arm 51 of the pawl 50 and causes the pawl to move in a counterclockwise direction until the arm 52 of the pawl clears the adjoining actuating arm 45 of the metering device 34. Since the weighted inlet 18 carried by the cord 20 exerts a stress on the drum 49 causing it together with the metering device 34 to rotate counterclockwise, then as soon as the arm 52 clears the associated actuating arm 45, the metering device 34 will rotate in a counterclockwise direction until the released arm 45 strikes the arm 53 of the pawl 50. This position is shown in FIGURE 5. The metering device 34 will continue to rotate and will move the pawl in a clockwise direction as shown in FIGURE 6. Simultaneously the pawl arm 52 will move toward the metering device 34 and engage the next successive arm 45 of the metering device 34 to prevent further rotation. Thus with this arrangement liquid will be delivered once every twenty-four hours, and the amount of liquid delivered is determined by the angular spacing of the arms 45 on the metering device 34. While in the illustrated embodiment of the invention, the timing device 33 includes twelve arms 43 which would provide for periodic deliveries at intervals on one to twelve days by properly setting selected arms 43. It is apparent that any number of arms 43 may be utilized depending on the application. Since the metering device 34 is similar to the timing device 33, one to twelve units of liquid can be delivered during any given delivery period. The quantity of water contained within a unit can be modified by design of the apparatus and is effected by the diameter of the drum 49 and the cross-sectional area of the liquid container.

By way of example, let it be assumed that two units of water is to be delivered every other day. To achieve this end alternate arms 43 on the timing device 33 would be retracted. Since the timing arm 39 makes a full rotation each twenty-four hours, then after completing an initial delivery the actuating arm 39 must complete two revolutions before an arm 43 of the timing device is brought into engagement with the arms of pawl 50 as previously described. This will permit the metering device 34 to rotate counterclockwise, but since every other arm 45 has been retracted, the metering device will move through twice the angle between each arm and thus deliver two units of liquid. With this arrangement and by providing a sufficiently large container 10, water can be delivered at periodic intervals for substantially long periods of time which makes the device particularly advantageous for watering of plants as well as for other similar purposes.

Another advantage of the invention is that slave units may be coupled with a master unit 12 and container 10 in order to deliver the same or different liquids at different intervals and at different rates. Referring to FIGURES 8 and 9, there is illustrated the master unit 12 as previously described. A first slave unit 12a which is identical to the unit 12 except for the omission of the timing motor 35 has its metering device 33a coupled by means of a shaft 65 to the shaft 41 by a coupling 66. With this arrangement the slave unit 12a can be adjusted to deliver liquid at predetermined intervals and at predetermined units of volume which may be the same or different than the time and unit delivery of the master unit 12. A modified form of slave unit is denoted by the numeral 12b. In this case the slave unit merely includes a drum 49b carried by a shaft 46b. This shaft is coupled in the instant embodiment of the invention to the shaft 46a of unit 12a by a coupling 67. In this case the slave unit 12b will deliver liquid at the same rate and quantity as the slave unit 12a. It is of course apparent that the unit 12b could be coupled directly to the shaft 47 of the master unit 12 if desired.

A modified form of the invention is illustrated in FIGURE 10. In this form of the invention, the container 10 and the metering apparatus 12 are identical to that previously illustrated and described. The valving means differs from the valving means of the previous embodiment of the invention in that it includes an expandable bellows 68 having a closed bottom portion 69 and an open top 70. The outlet pipe 71 is connected via a tube 72 to the bottom 69 of the bellows 68. The cord 20 is connected to the top of the bellows by a bridging element 73 to maintain the top edge of the bellows 68 substantially horizontal and not impede the flow of the liquid into the bellows when it is lowered. The bellows 68 may be made of any suitable flexible material such as plastic or the like and should have sufficient weight to affect rotation of the drum 49 in the manner previously described in connection with the embodiment of the invention shown in FIGURES 1 through 7.

While only certain embodiments of the invention have been illustrated and described, it is apparent that alterations, modifications and changes may be made without departing from the true scope and spirit thereof as defined by the appended claims.

What is claimed is:

1. Liquid metering apparatus comprising a container for liquid being metered, a centrally disposed weighted liquid inlet, an outlet at the bottom of said container, a spirally wound flexible hose axially aligned with the inlet and connecting said inlet and outlet, and lowering means, comprising a cord secured to said inlet for supporting and lowering said inlet in said liquid at a predetermined rate to deliver a selected flow of said liquid from said outlet, said hose when said inlet is at its lowermost point forming substantially a flat spiral lying on the bottom of said container.

2. Liquid metering apparatus according to claim 1 wherein said inlet lowering means includes individual timing and volume control means, said timing means controlling the delivery intervals and said volume control means determining the volume of liquid discharged during each delivery interval.

3. Liquid metering apparatus comprising a container for liquid being metered, a weighted liquid inlet, an outlet at the bottom of said container, a flexible hose connecting said inlet and outlet and means for lowering said inlet in said liquid at a predetermined rate to deliver a selected flow of said liquid from said outlet, said inlet lowering means comprising a shaft, a drum mounted on said shaft, a cord extending from said inlet and about said drum, a liquid metering device on said shaft and having an annular body and radially extending adjustable actuator arms, an oscillatory pawl operably associated with said metering device arms to permit periodic rotation of said device through angles determined by the angular spacing of said arms and timing means coupled with said pawl to initiate oscillatory motion of said pawl.

4. Liquid metering apparatus comprising a container for liquid being metered, a weighted liquid inlet, an outlet at the bottom of said container, a flexible hose connecting said inlet and outlet and means for lowering said inlet in said liquid at a predetermined rate to deliver a selected flow of said liquid from said outlet, said timing means comprising a rotatably supported timing device having radially extending adjustable actuator arms, and means coupled to said timing device for periodically moving said timing device through a predetermined angle, said timing device actuator arms operably engaging said pawl and causing it to move in one direction to release said metering device for rotation, said metering device in turn causing said pawl to move in the other direction to interrupt rotation of the metering device after moving through an angle determined by the angular spacing of the arms thereon.

5. Liquid metering apparatus comprising a container for liquid being metered, a weighted liquid inlet, an outlet at the bottom of said container, a flexible hose connecting said inlet and outlet and means for lowering said inlet in said liquid at a predetermined rate to deliver a selected flow of said liquid from said outlet, said inlet lowering means comprising a shaft, a drum mounted on said shaft, a cord extending from said inlet and about said drum, a liquid metering device on said shaft and having an annular body and radially extending adjustable actuator arms, an oscillatory pawl operably associated with said metering device arms to permit periodic rotation of said device through angles determined by the angular spacing of said arms and timing means coupled with said pawl to initiate oscillatory motion of said pawl, said pawl having three outwardly extending co-planar arms with two arms extending in one direction toward said metering device and the other arm extending in another direction toward said timing means, the upper of said arms being inclined upwardly and normally engaging said body and one of said actuator arms extending from the body to lock said metering device against rotation, said timing means periodically engaging said other arm to rotate the pawl and move said upper arm away from the metering device to clear said actuator arm and permit rotation of said metering device, the lower of said two arms being normally inclined downwardly and clearing said actuator arms and movable upwardly and in the path of the actuator arms when said pawl is moved by the timing means whereby said one actuator arm upon being released engages the lower pawl arm and rotates the pawl to move the upper arm into the path of the next successive actuator arm to interrupt rotation of said metering device.

6. Liquid metering apparatus comprising a container for liquid being metered, a weighted liquid inlet, an outlet at the bottom of said container, a flexible hose connecting said inlet and outlet and means for lowering said inlet in said liquid at a predetermined rate to deliver a selected flow of said liquid from said outlet, said inlet lowering means comprising a shaft, a drum mounted on said shaft, a cord extending from said inlet and about said drum, a liquid metering device on said shaft and having an annular body and radially extending adjustable actuator arms, an oscillatory pawl operably associated with said metering device arms to permit periodic rotation of said device through angles determined by the angular spacing of said arms and timing means coupled with said pawl to initiate oscillatory motion of said pawl, said pawl having three outwardly extendnig co-planar arms with two arms extending in one direction toward said metering device and the other arm extending in another direction toward said timing means, the upper of said arms being inclined upwardly and normally engaging said body and one of said actuator arms extending from the body to lock said metering device against rotation, said timing means periodically engaging said other arm to rotate the pawl and move said upper arm away from the metering device to clear said actuator arm and permit rotation of said metering device, the lower of said two arms being normally inclined downwardly and clearing said actuator arms and movable upwardly and in the path of the actuator arms when said pawl is moved by the timing means whereby said one actuator arm upon being released engages the lower pawl arm and rotates the pawl to move the upper arm into the path of the next successive actuator arm to interrupt rotation of said metering device, and wherein said timing means comprises a rotatably supported device having radially extending adjustable actuator arms, and a timer mechanically associated with said timing device for periodically moving said timing device through a predetermined angle, said timing device actuator arms operably engaging said pawl and causing it to move said upper arm away from said metering device to release said metering device for rotation.

References Cited

UNITED STATES PATENTS

| | | | |
|---|---|---|---|
| 931,071 | 8/1909 | Livingston | 222—464 X |
| 2,188,507 | 1/1940 | Harris | 222—70 |
| 2,956,713 | 10/1960 | Kerley | 222—464 |

ROBERT B. REEVES, *Primary Examiner.*